(12) United States Patent
Chichkov

(10) Patent No.: US 10,725,773 B2
(45) Date of Patent: Jul. 28, 2020

(54) MASS PROPAGATION OF SOURCE CODE CHANGES

(71) Applicant: Articoder, Inc., Sunnyvale, CA (US)

(72) Inventor: Dmitry Chichkov, Sunnyvale, CA (US)

(73) Assignee: Articoder, Inc., Sunnyvale, CA (US)

( * ) Notice: Subject to any disclaimer, the term of this patent is extended or adjusted under 35 U.S.C. 154(b) by 241 days.

(21) Appl. No.: 15/997,110

(22) Filed: Jun. 4, 2018

(65) Prior Publication Data

US 2018/0357062 A1 Dec. 13, 2018

Related U.S. Application Data

(60) Provisional application No. 62/516,526, filed on Jun. 7, 2017.

(51) Int. Cl.
*G06F 8/71* (2018.01)

(52) U.S. Cl.
CPC ...................... *G06F 8/71* (2013.01)

(58) Field of Classification Search
CPC .... G06F 8/20; G06F 8/70–78; G06F 11/3664; G06Q 10/06
See application file for complete search history.

(56) References Cited

U.S. PATENT DOCUMENTS

| 2009/0019426 | A1* | 1/2009 | Baeumer | G06F 8/71 717/122 |
| 2011/0307862 | A1* | 12/2011 | Abrams | G06F 8/71 717/120 |
| 2015/0339572 | A1* | 11/2015 | Achin | G06N 5/02 706/46 |
| 2018/0107479 | A1* | 4/2018 | Duppenthaler | G06F 8/75 |

OTHER PUBLICATIONS

Zoltan Toth et al., "Using Version Control History to Follow the Changes of Source Code Elements," 2013 [retrieved on Mar. 25, 2020], 17th European Conference on Software Maintenance and Reengineering, pp. 319-322, downloaded from <url>:https://ieeexplore.ieee.org. (Year: 2013).*

Thomas Frtiz et al., "A degree-of-knowledge model to capture source code familiarity," 2010 [retrieved on Mar. 25, 2020], ICSE '10: Proceedings of the 32nd ACM/IEEE International Conference on Software Engineering, vol. 1, pp. 385-394, downloaded from <url>:https://dl.acm.org. (Year: 2010).*

* cited by examiner

*Primary Examiner* — S. Sough
*Assistant Examiner* — Stephen D Berman
(74) *Attorney, Agent, or Firm* — Schwegman Lundberg & Woessner, P.A.

(57) ABSTRACT

Source code included in a number of independent source code repositories is scanned for a change made to the respective source code. A change made in the source code included in an originating repository from the number of independent source code repositories is identified by applying a statistical model. Upon identifying the change, it is automatically propagated to the source code of at least one target repository.

20 Claims, 5 Drawing Sheets

MASS PROPAGATION OF SOURCE CODE CHANGES

CROSS-REFERENCE TO RELATED APPLICATION

This patent application claims the benefit of U.S. Provisional Patent Application No. 62/516,526, filed Jun. 7, 2017, entitled "MASS PROPAGATION OF SOURCE CODE CHANGES", which is incorporated by reference herein in its entirety.

TECHNICAL FIELD

Embodiments of the present disclosure relate generally to online source code repositories and, more particularly, but not by way of limitation, to mass propagation of source code changes.

BACKGROUND

A version control system (or revision control system) is a system that tracks incremental versions (or revisions) of files and, in some cases, directories over time. Version control systems are useful not only because they track various versions of a file or a directory of a user or a group of users, but also because they allow users to explore the respective changes, which resulted in each of those versions. At the core of version control systems is the repository, which is a central store of that system's data. The repository usually stores information in the form of a filesystem tree, i.e., a hierarchy of files and directories. Any number of client systems can connect to the repository, and then read or write to these files. When a file undergoes a series of changes, the repository tracks each version of the file and the respective users who made the changes.

Version control systems are used in the modern software development process to manage source code. There are various online source code repositories available on the market today. For example, GitHub®, Git®, Bitbucket®, and others. A source code repository is a file archive and web hosting facility where a large amount of source code, for software or for web pages, is kept. Those source code repositories can be kept publicly or privately. Online source code repositories are often used by open-source software projects and other multi-developer projects to handle various versions of the source code and to allow a number of users to work on its development.

BRIEF DESCRIPTION OF THE DRAWINGS

Various ones of the appended drawings merely illustrate example embodiments of the present disclosure and cannot be considered as limiting its scope.

Figure 1:
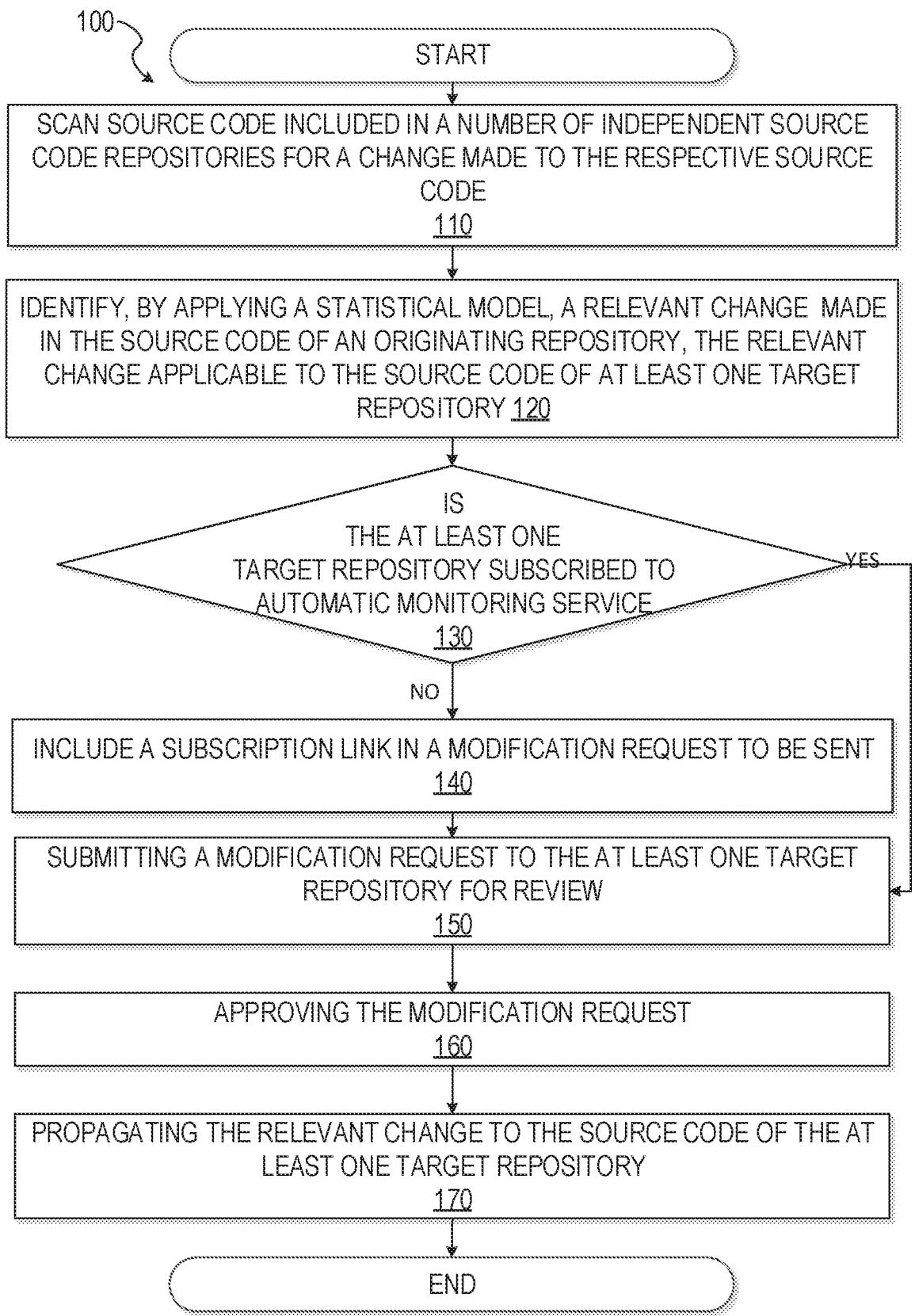
FIG. 1 illustrates a method for mass propagation of source code changes, according to one embodiment.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Online source code repositories can be forked. Forking a repository is the process of producing a personal copy of a project—i.e., a fork is a copy of a repository. The fork may be kept private, e.g., a clone copy stored in the memory of a client system, or may be kept public, e.g., a copy accessible over the Internet. Source code repositories are kept public or private depending, among other things, on the business needs and licenses of the original repositories being forked.

Forking a repository allows you to freely experiment with changes without affecting the original software project. Most commonly, forks are used to either propose changes to another project or to use another project as a starting point for a new project. When the repositories are forked or are otherwise independent, changing the source code of one online repository does not lead to the same changes being made to another online repository. A large number of source code repositories that are available online are owned or managed by separate entities and are operating independently of each other, i.e., the repositories are isolated from each other. Repositories are operating independently or are isolated from each other when changes in one are not reflected in the other repositories.

Sometimes a change to the source code in one repository may be applicable to other independent source code repositories, public or private. For example, a certain security vulnerability or a bug pertaining to the source code of the original repository being forked may only be fixed in the fork without the change being proposed for incorporation back to the original repository. But changes made in the source code in one repository may also be applicable to other repositories even when those repositories are not forks (e.g., when the repositories share other common parts). Examples of common parts that may be shared among independent source code repositories include, but are not limited to, programming languages used in the software projects, core libraries and frameworks, library dependencies, example code from: documentation, literature or social collaborative development sites, and common mistakes. Thus, changes to the common parts among the repositories may be applicable to other unrelated repositories that share, for example, the same programming language, library or other common part. In one example, the same mistake in using a specific programming language or library can often times be repeated in various unrelated software projects. Example of common mistakes may be that in PHP the sign "=" is used to compare secure strings instead of the command "hash_equals". This can lead to the same vulnerability or mistake being fixed a number of times. To illustrate, there are millions of active code repositories. It is not uncommon to find thousands of those millions of active code repositories that have fixed a shared vulnerability and thousands that have not yet fixed the same vulnerability. The fixing of common mistakes is not limited to fixing vulnerabilities. Having various software developers fix the same vulnerability over and over again is of course redundant and wasted effort. This lack of efficiency and redundancy is being addressed by a method and system proposed herein for mass propagation of source code changes, according to various example embodiments.

FIG. 1 illustrates a method 100 for mass propagation of source code changes, according to one embodiment. At 110, source code included in a number of independent or isolated source code repositories is scanned for a change made to the respective source code. Two repositories are independent or isolated when changes in the content of one does not affect the content of the other. In one embodiment, the independent source code repositories are accessible over the Internet. Repositories include a date of a last change used to determine which repositories to scan depending on whether the source code has been changed.

At 120, a relevant change made in the source code of an originating repository is identified by applying a statistical model. A relevant change is a change that is applicable to at least one more target repository. At 130, a check is performed to determine if the target repository is subscribed for an automatic monitoring service. The automatic monitoring service monitors for changes that can be incorporated into the source code of subscribed target repositories that have not yet implemented the relevant changes.

Upon determining that the target repository is already subscribed for the automatic monitoring service, at 150, a modification request is submitted to the at least one target repository for review. The modification request is in the form of a pull request. The modification request includes a suggestion for incorporation of the relevant change into the at least one target repository. The modification request is reviewed by respective software developers in charge of implementing changes to the at least one target repositories. In one embodiment, upon determining that the target repository is not subscribed to the automatic monitoring service, at 140, a subscription link is included in the modification request to be sent. A repository can be subscribed by completing a subscription form available via the subscription link.

At 160, the modification request is approved as a result of human review process, for example, by a software engineer managing proposed changes to the at least one target repository. Upon approving the modification request, the relevant change is propagated to the source code of the at least one target repository. For example, the same change is replicated to and incorporated into relevant parts of the source code of the at least one target repository.

Figure 2:
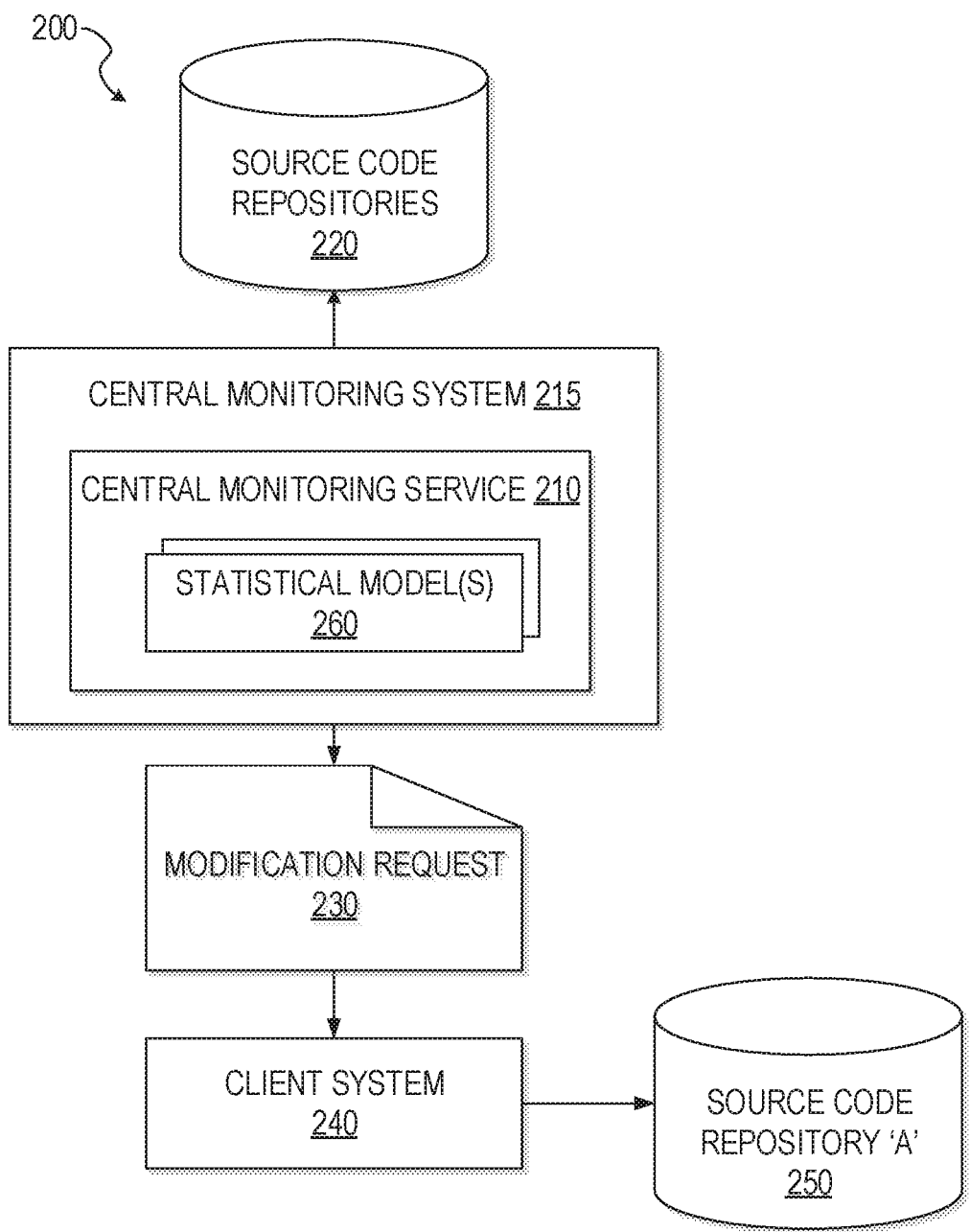
FIG. 2 illustrates a system for mass propagation of source code changes, according to one embodiment.

FIG. 2 illustrates a system 200 for mass propagation of source code changes, according to one embodiment. A central monitoring service 210 scans source code repositories 220 for relevant changes. In one embodiment, one or more of source code repositories 220 are subscribed to the central monitoring service 210. In one embodiment, one or more of source code repositories 220 are open source projects publicly available via the Internet. In one embodiment, a list that includes source code repositories 220 is assembled from public lists, or from links to open source repositories supplied by users during a subscription process described in FIG. 3. In one embodiment, more processing time is allocated to repositories linked individually by users or to more popular repositories. Popularity is determined by a number of ratings to a repository and a number of contributors.

The central monitoring service 210 runs on a central monitoring system 215. The central monitoring service 210 identifies relevant changes made to source code in source code repositories 220 by applying one or more statistical models 260. In one embodiment, statistical models 260 determine what a relevant change is by determining various metrics or parameters including, but not limited to, 'applicability', 'value', 'confidence' and 'license compatibility'.

A particular potential code change, or aggregate statistics describing the code change, may apply or not to a target repository. 'Applicability' is a metric that may match an expert estimate onto a fitness or applicability of a potential code change. One example of code change that may apply to various isolated repositories may be to change a dependency or reference in the source code to an outdated library. Thus, a relevant change may be a change of a version of a dependency library that is used in a target repository. Another example is adding a 'sanitize ( ) wrapper' function call for strings that are supplied by users. An example of changes that are irrelevant or not applicable to target repositories is a change in the repositories of unrelated programming languages, frameworks, libraries, or a change of a low quality. Most of the changes in the independent repositories may be unrelated, and not common or applicable to other repositories. Some of those changes are performed by unskilled software engineers. In one embodiment, statistical models 260 determine the value of the applicability metric based at least in part on including, but not limited to, the reputation metric of a particular contributor, visibility of a change being accepted, repeated appearance and acceptance of the same changes.

Source code changes and the impact of those source code changes vary from trivial, such as correcting a typo in a comment section, to more critical ones, such as fixing a vulnerability in the source code that may expose the software product to business risks. 'Value' is a metric that represents the level of impact a change would have to the target repository if incorporated. In one embodiment, this value may be determined by an expert. When based on a large set of examples, the value metric may also be determined by a statistical model. An example of such a model is a linear regression or a neural network model. One of the parameters that in part determines the 'value' of a change is the amount of time spent by an expert to review the contribution. This amount of time correlates both with the complexity of the change and with the impact of the change.

The various statistical models 260 may have variances as to their level and ability to predict changes that are relevant. In one embodiment, a 'confidence' metric may be a value indicating the likelihood that a proposed relevant change will be incorporated in one or more of the target repositories. In one embodiment, the confidence metric may be a value indicating how well the probability distribution encoded in the model matches the data in the source code repositories 220. A threshold may be used based at least in part on the confidence score. For example, depending on the value of the confidence score, it is determined whether the potential contribution is to be discarded, whether there is a necessity of additional review by an expert, or whether the contribution may be immediately submitted to target repositories. A contribution may be a pull request that includes a proposed source code change that is ready for incorporation into target repositories upon approval of the submission.

In one embodiment, one or more of statistical models 260 determine licensing information of both source and target repositories. An example of such a model is a supervised multi-class classifier model trained on a set of repositories with a license set known from expert annotations. A final decision on whether the license applies is made by an expert reviewer, before the contribution is released or modification request 230 is submitted for review. Thus, one or more of statistical models 260 determine 'license compatibility' for a relevant change to be submitted by the modification request 230. The target repository may have constraints onto acceptable license for new contributions. For example, MIT (Massachusetts Institute of Technology) and BSD (Berkeley Software Distribution) licensed contributions may be accepted, while GPLv3 (GNU General Public License) licensed contributions may not be accepted. Source code in the source repositories also carries a license and is accounted for. If a propagation of a change results in a direct copy of the code from one of such repositories, the license applies to the change being copied. Thus, the license has to be compatible between the two project and proper attribution of the original code has to be included with the change, for example extra attribution added into the 'LICENSE' file of target project. Identification of the 'LICENSE' file is performed by statistical methods. If the propagation of the change does not result in a direct copy of the code from one of such repositories, the original license may not apply, as only aggregate statistics of the change may be being used and not the code itself. An example of such changes, could be: a change of a version of a dependency, change of a particular function or operator being used, addition or removal of extra 'wrapper' function call. In some embodiments, the central monitoring service 210 computes a first goodness of fit score of the fitted statistical model to the change made in the source code included in the originating repository, and a second goodness of fit score of the fitted statistical model to a source code in a repository from among the plurality of independent source code repositories, other than the originating repository. The goodness of fit describes how well the fitted statistical model fits a set of observations. For example, the following tests and their underlying measures of fit can be used: Kolmogorov-Smirnov test, Cramér-von Mises criterion, Anderson-Darling test, Shapiro-Wilk test, Chi-squared test, Akaike information criterion, Hosmer-Lemeshow test, Kuiper's test. The central monitoring service 210 then computes a joint goodness of fit score based on the first goodness of fit score and the second goodness of fit score. For example, the joint goodness of fit score can be computed by multiplying the first goodness of fit score and the second goodness of fit score. If the joint goodness of fit score transgresses a threshold, the central monitoring service 210 classifies the change made in the source code included in the originating repository as the statistically relevant change.

In one embodiment, a statistical model from the statistical models 260 may be a discriminative model. The discriminative model is a hard-coded filter that identifies a single-line change, determines whether the single-line change has been repeated at other independent source code repositories, and whether the original line before the change is included in a target repository that has not implemented the change yet. Based on the discriminative model, the central monitoring service 210 determines whether a single line of source code has been changed in the source code repositories 220. The central monitoring service 210 identifies a single line change and the originating repository of the single line change from the source code repositories 220. In one embodiment, the single-line changes are identified based at least in part on the length of the original and modified files. For example, if the lengths are different and the difference is less than 80 characters, both files are retrieved and a custom 'diff' algorithm is being applied to these files. A diff algorithm is an algorithm that compares files, for example, source code data files. The 'diff' algorithm calculates the differences and similarities between files including source code. If the resulting change passes filtering criteria of the custom 'diff' algorithm, the change is being classified as a single-line change.

To determine whether the single line change is a relevant change, the discriminative statistical model from statistical models 260 is run by the central monitoring service 210 and determines whether an identical change is made to one or more repositories from source code repositories 220. In one embodiment, the central monitoring service 210 determines which change is a relevant one, by determining that the character-level difference of the change is an exact match in more than two unrelated, isolated, or otherwise independent repositories. In one embodiment, the more than two repositories are different from the originating repository and an at least one target repository. In one embodiment, an example of a target repository is source code repository 'A' 250. Source code repository 'A' 250 may be a repository from source code repositories 220. In one embodiment, the central monitoring service 210 determines potential target repositories, by determining in which of the repositories from source code repositories 220 includes the original line before the change. In one embodiment, whitespace may be trimmed in the target repositories to isolate the original single line before the change.

When the same change has been implemented by various repositories from source code repositories 220 and when the number of repositories that independently have implemented the same change is statistically significant, then the change is a relevant change. In one embodiment, the number of repositories that have independently implemented the same change is considered statistically significant if it is above a threshold. In one embodiment, a change may be considered relevant if a ratio of a number of repositories that have independently implemented a particular change to a total number of repositories is above a threshold. The relevant change may be proposed for incorporation into one or more target repository, for example, in the form of pull modification request such as modification request 230.

In various embodiments, identification of a relevant change may be based at least in part on determining that the change is accompanied by textual description and the content of the textual description. In one embodiment, in combination or alone, criteria that is used by the central monitoring service 210 for identifying the relevant change include, but are not limited to, determining that the relevant change is explained by textual description and whether the textual description includes at least one of pre-determined set of words commonly associated with relevant changes. For example, it is determined whether a change is accompanied by a textual description, e.g. a comment, which includes the words 'fix' and 'vulnerability', and any variations thereof. For example, textual description stating "fixing a privilege escalation vulnerability" or "fixed semicolon bug" may be indicative of a relevant change. In one embodiment, the central monitoring service 210 identifies both the relevant single line change and the originating repository of the single line change.

Statistical models may include artificial intelligence models trained on changes logged in the archives of public and private repositories. Example of such models include, but are not limited to, a neural network, recurrent neural networks, multilayer recurrent neural networks, convolutional recurrent neural networks, convolutional recurrent neural networks with gated and residual units, cellular automatons. A particular example that works well with such data is a character-level deep recurrent encoder-decoder network with attention, convolutional, residual, rectified-linear and gated units.

In one embodiment, a first portion of source code included in a number of independent source code repositories is scanned. A generative statistical model of changes made to the respective source code is created based on the scanned first portion of source code. A relevant change applicable to source code of at least one target repository is generated. The relevant change is generated by applying the generative statistical model to a second, un-scanned portion of source code included in the number of independent source code repositories. The relevant change to the source code of at least one target repository is automatically propagated.

In some embodiments, the central monitoring service 210 fits the generative statistical model to the changes made to the scanned first portion of source code and computes a goodness of fit score of the fitted generative statistical model to the second un-scanned portion of source code. If the goodness of fit score transgresses a threshold, the central monitoring service 210 generates the statistically relevant change by applying the fitted generative statistical model to the second unscanned portion of source code.

In one embodiment, a generative encoder-decoder character-level model may be used. The generative encoder-decoder character-level model may be trained on the changes recorded in the open source code dataset that constitutes all the public repositories used in the open source Ubuntu operating system distribution. In one embodiment, C source code changes are included. In one embodiment, single file changes which include a comment between 32 and 256 characters are selected. The source code is pre-formatted with clang-format tool before and after the change. A custom diff algorithm may be applied to locate the starting and ending point of the change and determine the context of the change. In one embodiment, the changes that constitute single block change fitting, with the context, onto a single 80×25 screen are selected. The model training data constitutes a training set of fixed length encoder-decoder sequences. The encoder sequence is a 2000 character array, pre-formatted by a clang-format tool which constitutes the code block before the change. The decoder sequence is a 2000 character array, pre-formatted by a clang-format tool which constitutes the code block after the change concatenated with 256 character comment. Multiple models may be used, including Long Short-Term Memory (LS™) machine learning models. In another embodiment, a custom cellular-automaton model may be used.

Upon determining that an identical change is made to one or more source code repositories 220, the central monitoring service 210 classifies the single line change as a relevant change and creates modification request 230. The central monitoring service 210 outputs a proposed change in the form of modification request 230. Modification request 230 includes the change classified as a relevant change.

The central monitoring service 210 determines whether source code repository 'A' 250 is subscribed to the central monitoring service 210. If source code repository 'A' 250 is not subscribed, the central monitoring service 210 includes a subscription link in the modification request 230.

The central monitoring service 210 sends the modification request to at least one client system such as client system 240. In one embodiment, client system 240 manages source code repository 'A' 250. Source code repository 'A' 250 is a target source code repository in which the relevant change has not been implemented yet. In one embodiment, source code repository 'A' 250 may be stored on client system 240 or may be managed remotely via client system 240. In one embodiment, source code repository 'A' 250 is included in the list of source code repositories 220.

The modification request 230 is received at client system 240. In one embodiment, an optional human review of the modification request 230 is performed. For example, a software engineer managing changes applied to source code repository 'A' 250 may review, and approve or disapprove, the relevant change proposed by the modification request 230. Upon approval of the modification request 230 for propagation, the relevant changes is propagated to or replicated in source code repository 'A' 250.

In one embodiment, client monitoring system 215 may be a platform for which partners may contribute with new statistical models. Thus, statistical models 260 can be extended to include various custom models.

Figures 3A, 3B:
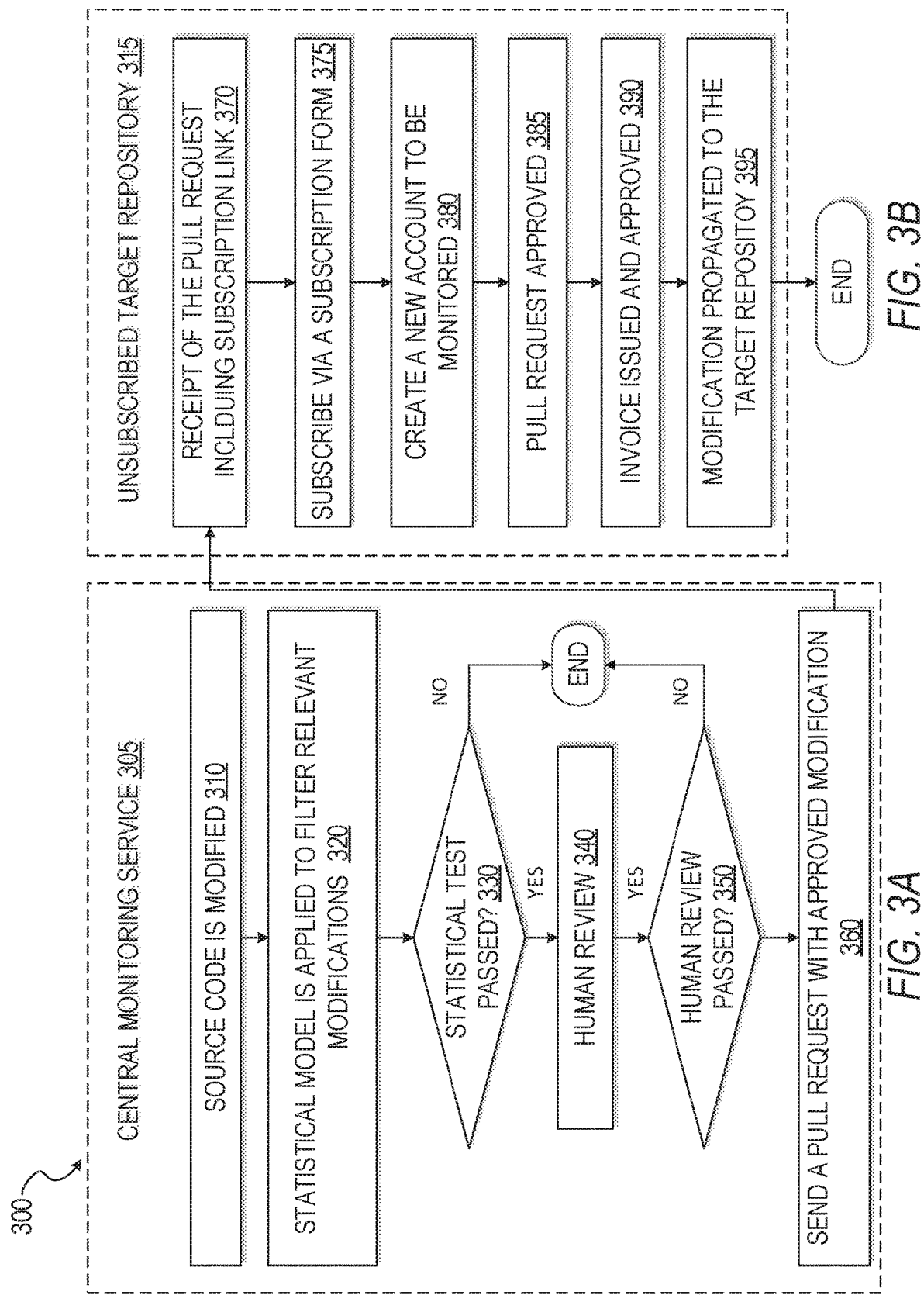
FIGS. 3A and 3B illustrates a process for subscribing a new target repository to be automatically monitored by a central monitoring service, according to one embodiment.

FIG. 3 illustrates a process 300 for subscribing a new target repository to be automatically monitored by a central monitoring service 305, according to one embodiment. In one embodiment, public open source repositories provide a feed with changes being made. Thus, process 300 may be triggered in response to changes added in the feed of changes. Private repositories are scanned on a regular basis for changes, for example, on a daily or hourly basis.

Process 300 may scan for changes being made to a list source code repositories including, but not limited to, on a regular basis, upon improvement of an existing statistical model, upon contribution with a new statistical model, or upon update of an existing statistical model. For example, when discriminative models are re-trained to include new lists of single-line changes that may be suitable for propagation. In another example, when generative encoder-decoder models are re-trained. In another embodiment, a change may occur in one of the target repositories itself. When such change occurs, the target repository is scanned for a relevant change and additional possible change candidates may be re-generated by the encoder-decoder model.

When the source code in one of the listed source code repositories has been modified at 310, a statistical model is applied at 320 to filter and determine whether the modification is relevant. If the modification does not pass a statistical test performed by the statistical model, process 300 ends. If the modification passes the statistical test, it is optionally further reviewed by a human at 340. If the modification does not pass the human review, process 300 ends. If the modification does pass the human review, a pull request that includes the approved modification is sent to one or more target repositories at 360. In one embodiment, it is determined whether the one or more target repositories are repositories that are already subscribed. If at least one target repository is not already subscribed, the modification request sent to that target repository is amended to include an invitation to subscribe to a central monitoring service 210. For example, a subscription link may be included in the comment section of the modification request. When the link is followed, the unsubscribed repositories can be subscribed via a subscription form available online. The subscription form is provided by the central monitoring system 215. In one embodiment, whether or not to include a subscription link is determined based at least in part on acceptance frequency of the change, A-B testing and user studies.

For subscribed repositories a comment alongside the pull request with proposed modification includes an estimated value of the modification and an invoice. If the change is being rejected by a user of a repository, the rejection may be manually reviewed to determine the cause. If the change is being accepted by a user of a repository, upon reaching a threshold, a formal invoice is being sent by e-mail to, for example, a repository administrator with information regarding the last user who has accepted a proposed change. For such repositories the account balance of the repository may be checked, before running the central monitoring service on private repositories. If the account balance exceeds a threshold for a period of time, an e-mail is being issued to a repository administrator with information regarding the last user who has accepted a change from the system. Services may be terminated for accounts with large outstanding balances, high unexplained reject ratios or other system abuses.

Target repositories are identified based at least in part on whether there are outstanding pull requests sent by the automatic monitoring service; whether the difference between the number of rejected pull requests and accepted pull requests is, for example, lower than two; whether the modification is a relevant change for the target repository; whether the modification request is of high confidence, i.e., the value of the 'confidence' metric is high; and whether pull requests have not yet been submitted to the target repository. The outstanding pull requests are pull requests with modifications not yet implemented by the target repository.

In one embodiment, at least one of the identified target repositories is not subscribed to the automatic central monitoring service. At 370, the pull request including the approved modification and a subscription link is received at an unsubscribed target repository 315. For example, a software engineer who operates the unsubscribed target repository 315 may receive the pull request. By following the subscription link, the software engineer can link the unsubscribed repository to the automatic central monitoring service.

At 375, unsubscribed target repository 315 is subscribed via the subscription form. For example, the unsubscribed target repository 315 may be linked to the automatic central monitoring service by inputting or adding a link in the unsubscribed target repository 315 to the automatic central monitoring service (e.g., "git clone URL" of the service link). If the unsubscribed target repository 315 is public, no additional measures are necessary as access is freely available. However, if the unsubscribed target repository 315 is not public, access rights are required for the automatic monitoring service to access the unsubscribed target repository 315. For example, rights are granted to a user of the automatic central monitoring service, a public key of the monitoring service is added to the user with granted rights and, also, the user is granted permission to read from the unsubscribed target repository 315 and pull requests access. Upon performing those steps, unsubscribed target repository 315 may be subscribed and linked to the automatic monitoring service. At 380, a new account is created that is to be monitored by the central monitoring service. At 385, the pull request is approved for incorporation to the target repository 315. At 390, an invoice is issued by automatic monitoring service and approved by an administrator of the target repository 315. Upon approval of the invoice, the proposed modification is propagated to the target repository 315.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-3 are implemented in some embodiments in the context of a machine and an associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the invention in different contexts from the disclosure contained herein.

Software Architecture

Figure 4:
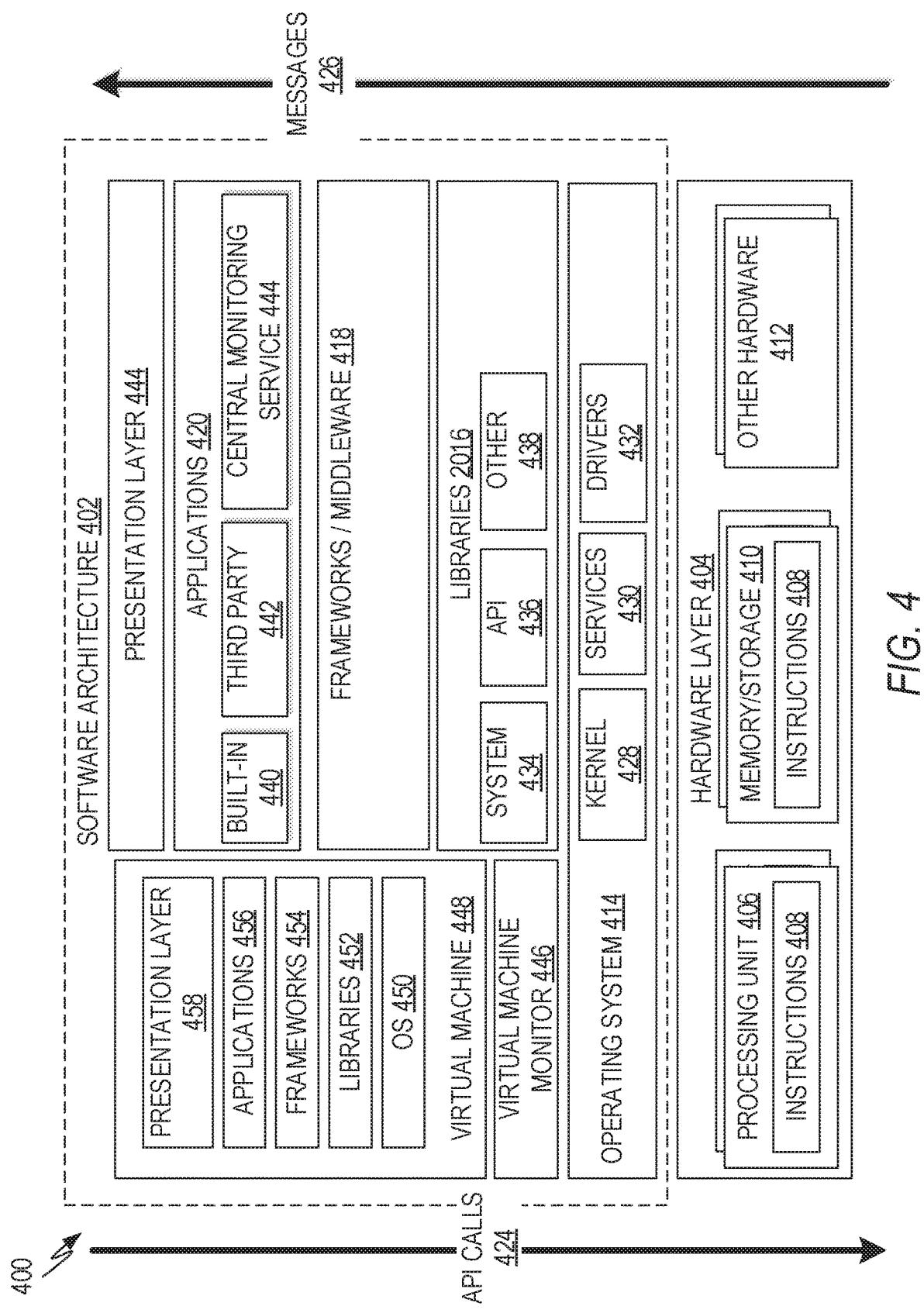
FIG. 4 is a block diagram illustrating an example of a software architecture that may be installed on a machine, according to some example embodiments.

FIG. 4 is a block diagram 400 illustrating a representative software architecture 402, which may be used in conjunction with various hardware architectures herein described. FIG. 4 is merely a non-limiting example of a software architecture and it will be appreciated that many other architectures may be implemented to facilitate the functionality described herein. The software architecture 402 may be executing on hardware such as machine 500 of FIG. 5 that includes, among other things, processors 510, memory 530, and I/O components 550. A representative hardware layer 404 is illustrated and can represent, for example, the machine 500 of FIG. 5. The representative hardware layer 404 comprises one or more processing units 406 having associated executable instructions 408. Executable instructions 408 represent the executable instructions of the software architecture 402, including implementation of the methods, modules and so forth of FIGS. 1-3. Hardware layer 404 also includes memory and/or storage modules 410, which also have executable instructions 408. Hardware layer 404 may also comprise other hardware as indicated by 412 which represents any other hardware of the hardware layer 404, such as the other hardware illustrated as part of machine 500.

In the example architecture of FIG. 4, the software 402 may be conceptualized as a stack of layers where each layer provides particular functionality. For example, the software 402 may include layers such as an operating system 414, libraries 416, frameworks/middleware 418, applications 420 and presentation layer 422. Operationally, the applications 420 and/or other components within the layers may invoke application programming interface (API) calls 424 through the software stack and receive a response, returned values, and so forth illustrated as messages 426 in response to the API calls 424. The layers illustrated are representative in nature and not all software architectures have all layers. For example, some mobile or special purpose operating systems may not provide a frameworks/middleware layer 418, while others may provide such a layer. Other software architectures may include additional or different layers.

The operating system 414 may manage hardware resources and provide common services. The operating system 414 may include, for example, a kernel 428, services 430, and drivers 432. The kernel 428 may act as an abstraction layer between the hardware and the other software layers. For example, the kernel 428 may be responsible for memory management, processor management (e.g., scheduling), component management, networking, security settings, and so on. The services 430 may provide other common services for the other software layers. The drivers 432 may be responsible for controlling or interfacing with the underlying hardware. For instance, the drivers 432 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 416 may provide a common infrastructure that may be utilized by the applications 420 and/or other components and/or layers. The libraries 416 typically provide functionality that allows other software modules to perform tasks in an easier fashion than to interface directly with the underlying operating system 414 functionality (e.g., kernel 428, services 430 and/or drivers 432). The libraries 416 may include system 434 libraries (e.g., C standard library) that may provide functions such as memory allocation functions, string manipulation functions, mathematic functions, and the like. In addition, the libraries 416 may include API libraries 436 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 416 may also include a wide variety of other libraries 438 to provide many other APIs to the applications 420 and other software components/modules.

The frameworks 418 (also sometimes referred to as middleware) may provide a higher-level common infrastructure that may be utilized by the applications 420 and/or other software components/modules. For example, the frameworks 418 may provide various graphic user interface (GUI) functions, high-level resource management, high-level location services, and so forth. The frameworks 418 may provide a broad spectrum of other APIs that may be utilized by the applications 420 and/or other software components/modules, some of which may be specific to a particular operating system or platform.

The applications 420 includes built-in applications 440 and/or third party applications 442 and/or central monitoring service 444. Central monitoring service 444 is described in various embodiments in FIGS. 1-3. Examples of representative built-in applications 440 may include, but are not limited to, a contacts application, a browser application, a book reader application, a location application, a media application, a messaging application, and/or a game application. Third party applications 442 may include any of the built in applications as well as a broad assortment of other applications. In a specific example, the third party application 442 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 442 may invoke the API calls 424 provided by the mobile operating system such as operating system 414 to facilitate functionality described herein.

The applications 420 may utilize built in operating system functions (e.g., kernel 428, services 430 and/or drivers 432), libraries (e.g., system 434, APIs 436, and other libraries 438), frameworks/middleware 418 to create user interfaces to interact with users of the system. Alternatively, or additionally, in some systems interactions with a user may occur through a presentation layer. In these systems, the application/module "logic" can be separated from the aspects of the application/module that interact with a user.

Some software architectures utilize virtual machines. In the example of FIG. 4, this is illustrated by virtual machine 448. A virtual machine creates a software environment where applications/modules can execute as if they were executing on a hardware machine (such as the machine of FIG. 5, for example). A virtual machine is hosted by a host operating system (operating system 414 in FIG. 5) and typically, although not always, has a virtual machine monitor 446, which manages the operation of the virtual machine as well as the interface with the host operating system (i.e., operating system 414). A software architecture executes within the virtual machine such as an operating system 450, libraries 452, frameworks/middleware 454, applications 456 and/or presentation layer 458. These layers of software architecture executing within the virtual machine 448 can be the same as corresponding layers previously described or may be different.

Example Machine Architecture and Machine-Readable Medium

Figure 5:
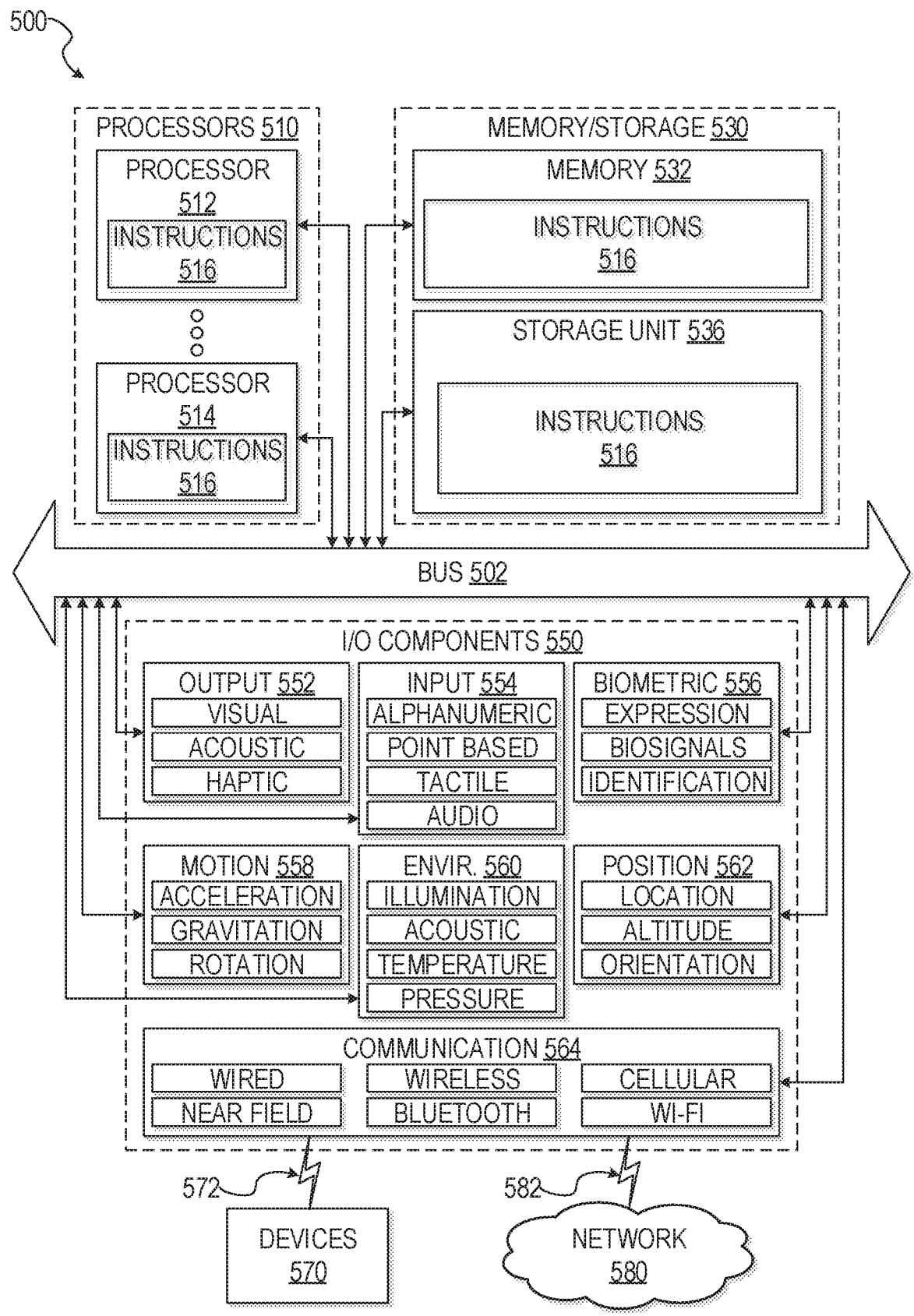
FIG. 5 illustrates a diagrammatic representation of a machine in the form of a computer system within which a set of instructions may be executed for causing the machine to perform any one or more of the methodologies discussed herein, according to an example embodiment.

FIG. 5 is a block diagram illustrating components of a machine 500, according to some example embodiments, able to read instructions from a machine-readable medium (e.g., a machine-readable storage medium) and perform any one or more of the methodologies discussed herein. Specifically, FIG. 5 shows a diagrammatic representation of the machine 500 in the example form of a computer system, within which instructions 516 (e.g., software, a program, an application, an applet, an app, or other executable code such as for client monitoring service for mass propagation of changes) for causing the machine 500 to perform any one or more of the methodologies discussed herein may be executed. For example the instructions may cause the machine to execute the flow diagrams of FIGS. 1-3. Additionally, or alternatively, the instructions may implement the central monitoring service of FIGS. 1-3, and so forth. The instructions transform the general, non-programmed machine into a particular machine programmed to carry out the described and illustrated functions in the manner described. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 516, sequentially or otherwise, that specify actions to be taken by machine 500. Further, while only a single machine 500 is illustrated, the term "machine" shall also be taken to include a collection of machines 500 that individually or jointly execute the instructions 516 to perform any one or more of the methodologies discussed herein.

The machine 500 may include processors 510, memory 530, and I/O components 550, which may be configured to communicate with each other such as via a bus 502. In an example embodiment, the processors 510 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 512 and processor 514 that may execute instructions 516. The term "processor" is intended to include multi-core processor that may comprise two or more independent processors (sometimes referred to as "cores") that may execute instructions contemporaneously. Although FIG. 5 shows multiple processors, the machine 500 may include a single processor with a single core, a single processor with multiple cores (e.g., a multi-core process), multiple processors with a single core, multiple processors with multiples cores, or any combination thereof.

The memory/storage 530 may include a memory 532, such as a main memory, or other memory storage, and a storage unit 536, both accessible to the processors 510 such as via the bus 502. The storage unit 536 and memory 532 store the instructions 516 embodying any one or more of the methodologies or functions described herein. The instructions 516 may also reside, completely or partially, within the memory 532, within the storage unit 536, within at least one of the processors 510 (e.g., within the processor's cache memory), or any suitable combination thereof, during execution thereof by the machine 500. Accordingly, the memory 532, the storage unit 536, and the memory of processors 510 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 516. The term "machine-readable medium" shall also be taken to include any medium, or combination of multiple media, that is capable of storing instructions (e.g., instructions 516) for execution by a machine (e.g., machine 500), such that the instructions, when executed by one or more processors of the machine 500 (e.g., processors 510), cause the machine 500 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 550 may include a wide variety of components to receive input, provide output, produce output, transmit information, exchange information, capture measurements, and so on. The specific I/O components 550 that are included in a particular machine will depend on the type of machine. For example, portable machines such as mobile phones will likely include a touch input device or other such input mechanisms, while a headless server machine will likely not include such a touch input device. It will be appreciated that the I/O components 550 may include many other components that are not shown in FIG. 5. The I/O components 550 are grouped according to functionality merely for simplifying the following discussion and the grouping is in no way limiting. In various example embodiments, the I/O components 550 may include output components 552 and input components 554. The output components 552 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 554 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 550 may include biometric components 556, motion components 558, environmental components 560, or position components 562 among a wide array of other components. For example, the biometric components 556 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 558 may include acceleration sensor components (e.g., accelerometer), gravitation sensor components, rotation sensor components (e.g., gyroscope), and so forth. The environmental components 560 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 562 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 550 may include communication components 564 operable to couple the machine 500 to a network 580 or devices 570 via coupling 582 and coupling 572 respectively. For example, the communication components 564 may include a network interface component or other suitable device to interface with the network 580. In further examples, communication components 564 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 570 may be another machine or any of a wide variety of peripheral devices (e.g., a peripheral device coupled via a Universal Serial Bus (USB)).

Moreover, the communication components 564 may detect identifiers or include components operable to detect identifiers. For example, the communication components 564 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 564, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 580 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 580 or a portion of the network 580 may include a wireless or cellular network and the coupling 582 may be a Code Division Multiple Access (CDMA) connection, a Global System for Mobile communications (GSM) connection, or other type of cellular or wireless coupling. In this example, the coupling 582 may implement any of a variety of types of data transfer technology, such as Single Carrier Radio Transmission Technology (IxRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 516 may be transmitted or received over the network 580 using a transmission medium via a network interface device (e.g., a network interface component included in the communication components 564) and utilizing any one of a number of well-known transfer protocols (e.g., hypertext transfer protocol (HTTP)). Similarly, the instructions 516 may be transmitted or received using a transmission medium via the coupling 572 (e.g., a peer-to-peer coupling) to devices 570. The term "transmission medium" shall be taken to include any intangible medium that is capable of storing, encoding, or carrying instructions 516 for execution by the machine 500, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The invention claimed is:

1. A computer implemented method to propagate a source code change to at least one target repository of a plurality of independent source code repositories, the method comprising:

scanning source code included in the plurality of independent source code repositories for a change made to the respective source code;

identifying, by applying a statistical model, a statistically relevant change made in source code included in an originating repository from the plurality of independent source code repositories, the statistically relevant change being applicable to source code of the at least one target repository, wherein identifying, by applying the statistical model, the statistically relevant change made in the source code included in the originating repository comprises:

fitting the statistical model to a change made in the source code included in the originating repository;

computing a first goodness of fit score of the fitted statistical model to the change made in the source code included in the originating repository;

computing a second goodness of fit score of the fitted statistical model to a source code in a repository from among the plurality of independent source code repositories, other than the originating repository;

computing a joint goodness of fit score based on the first goodness of fit score and the second goodness of fit score;

determining that the joint goodness of fit score transgresses a threshold; and responsive to the determining that the joint goodness of fit score transgresses the threshold, classifying the change made in the source code included in the originating repository as the statistically relevant change; and automatically propagating the statistically relevant change to the source code of the at least one target repository.

2. The method of claim 1, wherein identifying the statistically relevant change made in the source code of the originating repository further comprises:
scanning the plurality of independent source code repositories for a single line change;
identifying the single line change and the originating repository of the single line change;
identifying an identical change in one or more repositories from the plurality of independent source code repositories; and
based on the identifying of the identical change in the one or more repositories, classifying the single line change as the statistically relevant change.

3. The method of claim 2, wherein identifying the statistically relevant change made in the source code of the originating repository further comprises:
determining that the statistically relevant change is explained by textual description; and
parsing the textual description for a pre-determined set of words commonly associated with statistically relevant changes.

4. The method of claim 2 further comprising:
identifying the at least one target repository by determining that the at least one target repository includes a line of source code corresponding to an original line of source code before the single line change has been made.

5. The method of claim 1 further comprising:
based on identifying the statistically relevant change, submitting a modification request to the at least one target repository for review.

6. The method of claim 5 further comprising:
determining that the at least one target repository is not subscribed to an automatic monitoring service performed by a central monitoring system, and
based on the determining that the at least one target repository is not subscribed to the automatic monitoring service, including a subscription link in the modification request.

7. The method of claim 5 further comprising:
upon receiving the modification request at a client system storing the at least one target repository, receiving approval, from a user, of the modification request for propagation.

8. A computer system to propagate a source code change to at least one target repository from a plurality of independent source code repositories, the system comprising:
a memory storing computer executable instructions;
at least one computer processor coupled to the memory to execute the instruction, that upon execution perform operations comprising:
scanning source code included in the plurality of independent source code repositories for a change made to the respective source code;
identifying, by applying a statistical model, a statistically relevant change made in source code included in an originating repository from the plurality of independent source code repositories, the statistically relevant change applicable to source code of the at least one target repository, wherein identifying, by applying the statistical model, the statistically relevant change made in the source code included in the originating repository comprises:
fitting the statistical model to a change made in the source code included in the originating repository;
computing a first goodness of fit score of the fitted statistical model to the change made in the source code included in the originating repository;
computing a second goodness of fit score of the fitted statistical model to a source code in a repository from among the plurality of independent source code repositories, other than the originating repository;
computing a joint goodness of fit score based on the first goodness of fit score and the second goodness of fit score;
determining that the joint goodness of fit score transgresses a threshold; and
responsive to the determining that the joint goodness of fit score transgresses the threshold, classifying the change made in the source code included in the originating repository as the statistically relevant change; and
automatically propagating the statistically relevant change to the source code of the at least one target repository.

9. The system of claim 8, wherein the operations further comprise:
scanning the plurality of independent source code repositories for a single line change;
identifying the single line change and the originating repository of the single line change;
identifying an identical change in one or more repositories from the plurality of independent source code repositories; and
based on the identifying of the identical change in the one or more repositories, classifying the single line change as the statistically relevant change.

10. The system of claim 9, wherein identifying the statistically relevant change made in the source code of the originating repository further comprises:
determining that the statistically relevant change is explained by textual description; and
parsing the textual description for pre-determined set of words commonly associated with statistically relevant changes.

11. The system of claim 9, wherein the operations further comprise:
identifying the at least one target repository by determining that the at least one target repository includes a line of source code corresponding to an original line of source code before the single line change has been made.

12. The system of claim 8, wherein the operations further comprise:
based on identifying the statistically relevant change, submitting a modification request to the at least one target repository for review.

13. The system of claim 12, wherein the operations further comprise:
determining that the at least one target repository is not subscribed to an automatic monitoring service performed by a central monitoring system, and
based on the determining that the at least one target repository is not subscribed to the automatic monitoring service, including a subscription link in the modification request.

14. The system of claim 12, wherein the operations further comprise:
upon receiving the modification request at a client system storing the at least one target repository, receiving approval, from a user, of the modification request for propagation.

15. A non-transitory computer readable medium storing instructions thereon, which when executed by a processor cause a computer system to:
scan source code included in a plurality of independent source code repositories for a change made to the respective source code;
identify, by applying a statistical model, a statistically relevant change made in source code included in an originating repository from the plurality of independent source code repositories, the statistically relevant change applicable to source code of at least one target repository, wherein the identification, by applying the statistical model, of the statistically relevant change made in the source code included in the originating repository comprises:
fit the statistical model to a change made in the source code included in the originating repository;
compute a first goodness of fit score of the fitted statistical model to the change made in the source code included in the originating repository;
compute a second goodness of fit score of the fitted statistical model to a source code in a repository from among the plurality of independent source code repositories, other than the originating repository;
compute a joint goodness of fit score based on the first goodness of fit score and the second goodness of fit score;
determine that the joint goodness of fit score transgresses a threshold; and
responsive to the determination that the joint goodness of fit score transgresses the threshold, classify the change made in the source code included in the originating repository as the statistically relevant change; and
automatically propagate the statistically relevant change to the source code of the at least one target repository.

16. The computer readable medium of claim 15, wherein the instructions when executed by the processor cause the computer system further to:
scan the plurality of independent source code repositories for a single line change;
identify the single line change and the originating repository of the single line change;
identify an identical change in one or more repositories from the plurality of independent source code repositories; and
based on the identifying of the identical change in the one or more repositories, classify the single line change as the statistically relevant change.

17. The computer readable medium of claim 16, wherein the instructions when executed by the processor cause the computer system further to:
determine that the statistically relevant change is explained by textual description; and
parse the textual description for pre-determined set of words commonly associated with statistically relevant changes.

18. The computer readable medium of claim 17, wherein the instructions when executed by the processor cause the computer system further to:
identify the at least one target repository by determining that the at least one target repository includes a line of source code corresponding to an original line of source code before the single line change has been made.

19. The computer readable medium of claim 15, wherein the instructions when executed by the processor cause the computer system further to:
based on identifying the statistically relevant change, submit a modification request to the at least one target repository for review.

20. The computer readable medium of claim 19, wherein the instructions when executed by the processor cause the computer system further to:
determine that the at least one target repository is not subscribed to an automatic monitoring service performed by a central monitoring system, and
based on determining that the at least one target repository is not subscribed to the automatic monitoring service, include a subscription link in the modification request.

* * * * *